Patented June 29, 1943

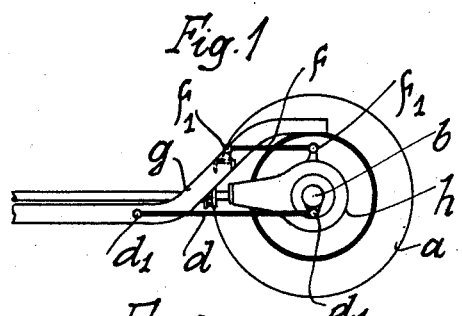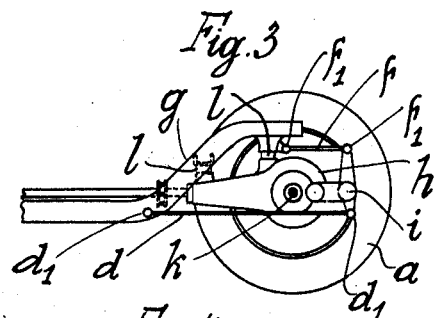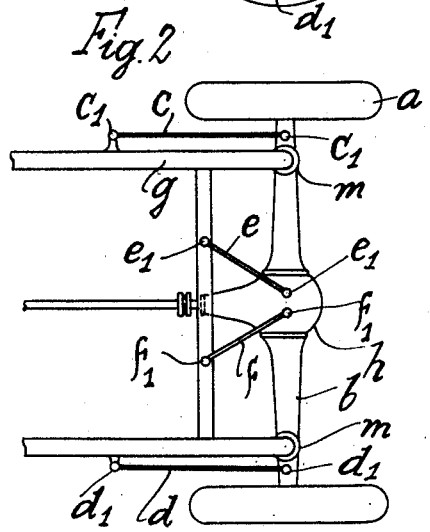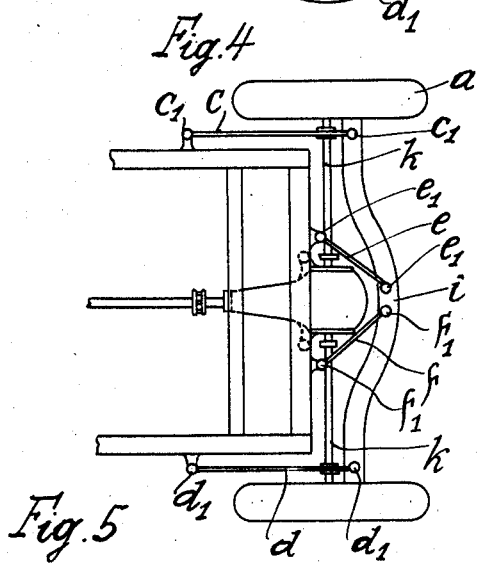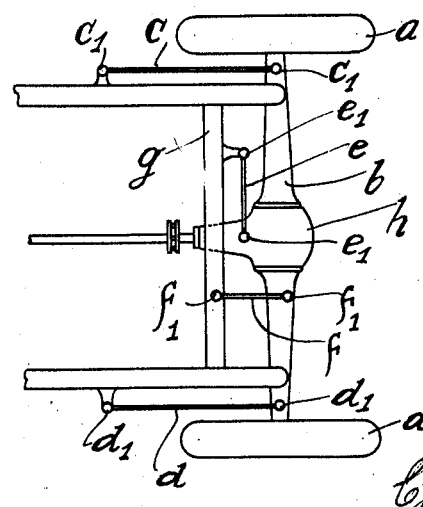

2,323,007

UNITED STATES PATENT OFFICE 2,323,007

RIGID REAR AXLE FOR MOTOR VEHICLES

Carl Borgward, Bremen, Germany; vested in the Alien Property Custodian

Application December 19, 1940, Serial No. 370,897
In Germany October 12, 1939

2 Claims. (Cl. 267—66)

The invention relates to a rigid rear axle for motor vehicles, in which the axle is guided by controlling rods arranged above and below it, and hingedly connected with the frame. It is known, to use such controlling rods especially also for rigid axles, which connect the wheels, and which are singly driven by the joint-shafts from the differential. In such controlling rod guides the controlling rods are stressed to bending.

The invention provides a construction, in which in simplest manner only with the aid of controlling rods, a rigid axle guided in vertical direction and also carrying out one-sided lateral movements, that is tilting movements, is guided against lateral shifting by joints and links only little loaded, which are stressed only to tension and pressure. Hereby it is possible to make the controlling rods light and thin.

The invention consists in that, besides the lower controlling rods situated in the longitudinal direction of the vehicle two upper controlling rods are arranged for guiding the axle, which upper controlling rods act in different directions and supplement the one the other, so that they commonly guide the axle in the longitudinal direction as well as in the transverse direction.

Other characteristic features of the invention consist in the special construction of the controlling rod arrangement.

The invention may be carried out in various manners. Several embodiments of the invention are illustrated in the drawing by way of example.

Figs. 1 and 2 show in side elevation and in top plan view the new controlling rod arrangement for a rigid rear axle spring-supported relative to the frame.

Figs. 3 and 4 show in side elevation and top plan view the controlling rod guiding for a rigid axle connecting the wheels, said wheels being driven by joint-shafts.

Fig. 5 shows another form of construction of the controlling rod arrangement for guiding the rigid axle.

The rigid axle $b$ carrying in known manner the driven wheels $a$ is guided, besides by the lower controlling rods $c$, $d$ arranged in the longitudinal direction of the vehicle and acting on the side ends of the rear axle near the wheels, by two upper controlling rods $e$, $f$ acting in different directions and situated above the axle.

These controlling rods are obliquely arranged the one relative to the other so that their effects supplement one another, in that they commonly guide the axle in the longitudinal direction as well as in the transverse direction. Owing to the adjustment of the controlling rods, which besides may be supported at their joints $c_1$, $d_1$, $e_1$, $f_1$ by ball joints or rubber bolsters, it is attained, that all controlling rods are stressed only in tension and compression. When lateral shearing forces act upon the wheels, no axle shifting can take place for the reason that the oscillation of the obliquely adjusted controlling rods is not possible, as according to the direction of the acting lateral shearing force always at least one controlling rod is stressed in tension and the other in compression.

In this construction it is also advantageous, that the two controlling rods $e$, $f$ hinged on the vehicle frame $g$ engage near the middle of the axle on the casing $h$ of the differential connected with the rigid axle, so that they directly act the one upon the other and guide the axle against lateral swaying and approximately in the middle of the vehicle.

In the form of construction shown in Figs. 3 and 4, the wheels $a$ are connected by the rigid axle $i$. They are driven by the differential gear $h$ by means of the joint-shafts $k$. Also in this construction the rigid axle is guided by controlling rods $e$, $f$ obliquely adjusted and mounted on the frame $g$, the casing of the differential being supported in rubber on the frame for instance at three points $l$. The shock absorption by springs of the rear axle can, as shown in Fig. 2, be effected by spiral springs $m$ bearing against the frame. In Fig. 4 the springs are omitted. If desired, blade springs may be also used for the shock absorption.

In the form of construction shown in Fig. 5, it is shown on a rigid axle $b$, that the controlling rod $f$ of the upper controlling rods is arranged in the longitudinal direction of the vehicle, whereas the other controlling rod $e$ is arranged completely or partly in the transverse direction. Both controlling rods are hinged on the vehicle frame $g$. Also in this form of construction, as the controlling rods are arranged at an angle the one to the other, taking up the lateral swaying forces is effected without stressing the controlling rods to bending. Also in this construction the shock absorption by springs can be effected in any desired manner by spiral springs or, if desired, by blade springs.

I claim:

1. In a rigid connection for motor vehicle rear axles, a frame having longitudinal members and a cross member, lower connecting rods connected to the under side of the axle adjacent its ends by ball and socket joints and extending forwardly, said lower rods being connected to said longitudinal members by ball and socket joints, and a pair of upper connecting rods having ball and socket connection at closely adjacent points on the upper side of the axle at the middle portion thereof, said upper rods having ball and socket connection at widely spaced points to the said cross member.

2. The connection of claim 1 characterized by having one of the upper rods extending transversely of the frame and the other at right angles to the first and longitudinally of the frame.

CARL BORGWARD.